(12) United States Patent
Wu et al.

(10) Patent No.: US 8,489,790 B2
(45) Date of Patent: Jul. 16, 2013

(54) CONTROL METHOD FOR EXTENDER

(75) Inventors: Hung-June Wu, New Taipei (TW); Cheng-Sheng Chou, New Taipei (TW)

(73) Assignee: June-On Technology Co., Ltd., New Taipei (TW)

( * ) Notice: Subject to any disclaimer, the term of this patent is extended or adjusted under 35 U.S.C. 154(b) by 204 days.

(21) Appl. No.: 13/032,714

(22) Filed: Feb. 23, 2011

(65) Prior Publication Data

US 2012/0054390 A1    Mar. 1, 2012

(30) Foreign Application Priority Data

Sep. 1, 2010 (TW) .............................. 99129398 A

(51) Int. Cl.
*G06F 13/38* (2006.01)
*G06F 13/40* (2006.01)

(52) U.S. Cl.
CPC ........ *G06F 13/4045* (2013.01); *G06F 13/4063* (2013.01)
USPC ............. 710/300; 710/62; 710/106; 710/310; 710/311

(58) Field of Classification Search
USPC ......................................................... 710/106
See application file for complete search history.

(56) References Cited

U.S. PATENT DOCUMENTS

| 7,617,341 | B2* | 11/2009 | McClintock et al. | ........... 710/73 |
| 7,917,674 | B2* | 3/2011 | Lin et al. | ......................... 710/73 |
| 8,108,576 | B2* | 1/2012 | Shen et al. | ..................... 710/72 |
| 8,255,580 | B2* | 8/2012 | Kang et al. | ..................... 710/10 |
| 2005/0171623 | A1* | 8/2005 | McClintock et al. | .......... 700/19 |
| 2008/0030331 | A1* | 2/2008 | Chen et al. | ................. 340/568.2 |
| 2008/0184320 | A1* | 7/2008 | Lou | ................. 725/98 |
| 2008/0198128 | A1* | 8/2008 | Tsai et al. | ..................... 345/156 |
| 2008/0288677 | A1* | 11/2008 | Kirshtein | ........................ 710/67 |
| 2008/0309584 | A1* | 12/2008 | Zhang | .............................. 345/5 |
| 2009/0184962 | A1* | 7/2009 | Kuriakose et al. | ............ 345/428 |
| 2011/0208963 | A1* | 8/2011 | Soffer | ........................... 713/168 |

* cited by examiner

*Primary Examiner* — Ryan Stiglic
(74) *Attorney, Agent, or Firm* — Chun-Ming Shih; HDLS IPR Services

(57) ABSTRACT

A control method for extender is proposed. A transmitting unit stops outputting image signal, voice signal or serial data to a receiving unit. A request signal is sent from the transmitting unit to the receiving unit by using the circuit through which the transmitting unit stops outputting image signal, voice signal or serial data to the receiving unit. Extended display identification data of a display device or peripheral data of a control device is sent from the receiving unit to the transmitting unit.

12 Claims, 10 Drawing Sheets

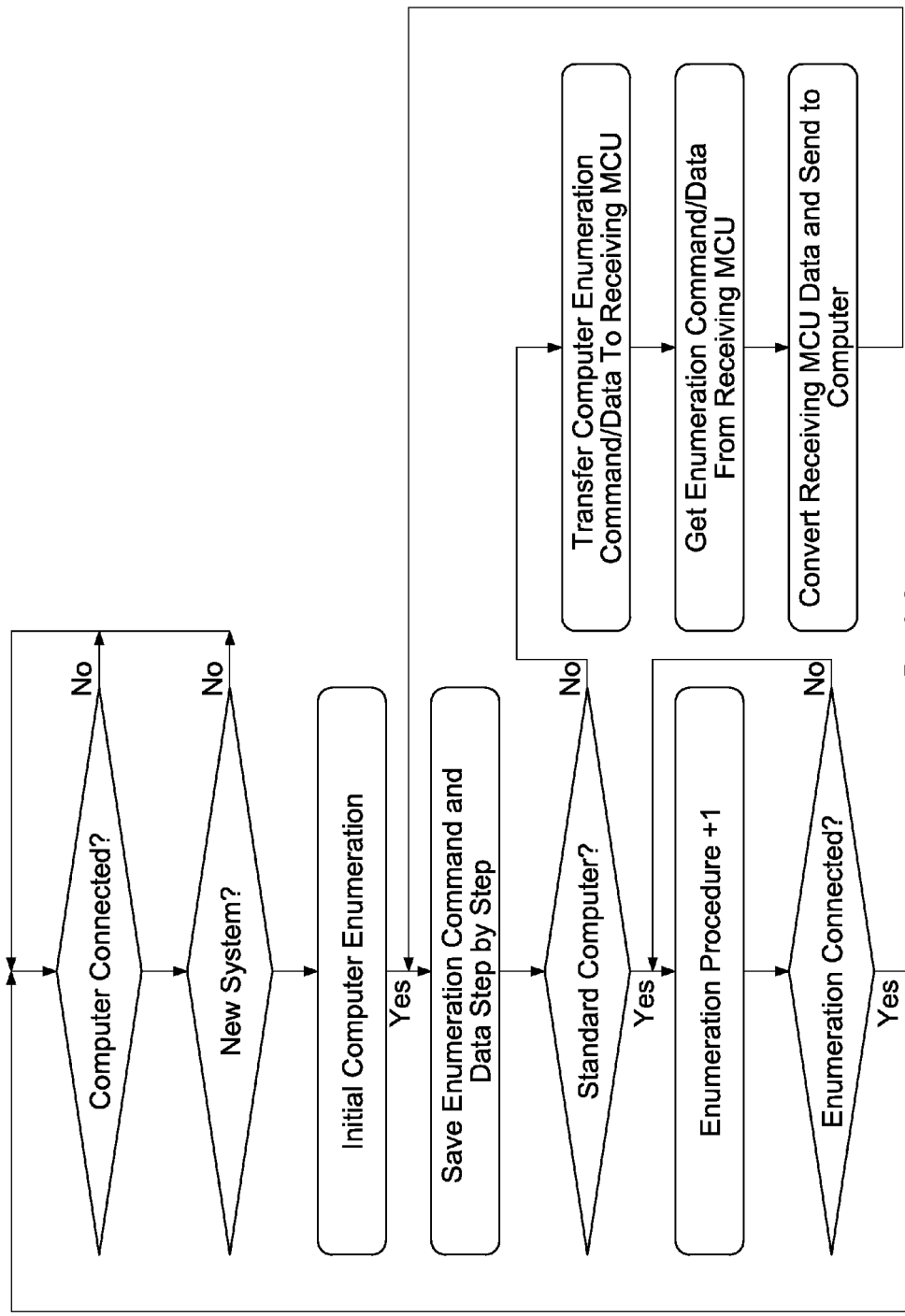

CONTROL METHOD FOR EXTENDER

BACKGROUND OF THE INVENTION

1. Field of the Invention

The invention relates to a control method for extender, and more particularly, to a control method for extender used in a two-way transmission of information.

2. Description of Prior Art

Please refer to FIG. 1. FIG. 1 is a block diagram of prior art of video/audio extender. A video/audio extender 100 includes a transmitting unit 102 and a receiving unit 104. The transmitting unit 102 may electrically connect to the receiving unit 104 by a network cable or optical fiber, for example. The transmitting unit 102 may electrically connect to a host device 106 such as a computer host or other Video/Audio player. The receiving unit 104 may electrically connect to an audio device 110 and a display device 112.

The host device 106 sends a video/audio signal 108 to the transmitting device unit. The transmitting unit 102 sends the video/audio signal 108 to the receiving unit 104. The receiving unit 104 sends the video/audio signal 108 to the audio device 110 and the display device 112. Finally, the audio device 110 and the display device 112 play the video/audio signal 108.

Please refer to FIG. 2. FIG. 2 is a block diagram of prior art of video/control device extender. A video/control device extender 200 comprises a transmitting unit 202 and a receiving unit 204. The transmitting unit 202 may electrically connect to the receiving unit 204 by a network cable or optical fiber, for example. The transmitting unit e 202 may electrically connect to a host device 206 such as a computer host or other Video/Audio player. The receiving unit 204 may electrically connect to a control device 208 (such as a mouse or keyboard), an audio device 212 and a display device 214.

The control device 208 sends a control signal 210 to the receiving unit 204. The receiving unit 204 sends the control signal 210 to the transmitting unit 202. The transmitting unit 202 sends the control signal 210 to the host device 206. Finally, the control signal 210 is processed by the host device 206 and played by the audio device 212 and display device 214.

Currently, the video/audio device extender and video/control device extender are widely used in various applications. However, the prior art of circuit layouts of the video/audio device extender and video/control device extender are used in a single way transmission of information. It is easy to cause poor image quality because the transmitting unit fails to correctly obtain an extended display identification data (EDID) of a display device. Also, because the transmitting unit fails to correctly obtain the peripheral data of a control device, the control device can not be operated smoothly. In case of a two-way transmission of information, it may require to add the number of cables, have complicate circuit layouts or decrease some previous function to achieve the purpose of a two-way communication. Therefore, it is inconvenient and complicate.

SUMMARY OF THE INVENTION

It is an object of the invention to overcome the problem of above prior art. The invention provides a control method for extender so as to simply achieve a two-way transmission of information.

To achieve the above object of the invention, a control method for extender of the invention is used in an extender, the extender having a transmitting unit and a receiving unit, the control method for extender comprising: stopping outputting image signal, voice signal or serial data from a transmitting unit to a receiving unit; sending a request signal from the transmitting unit to the receiving unit by using the circuit through which the transmitting unit stops outputting image signal, voice signal or serial data to the receiving unit; and sending an extended display identification data of a display device or peripheral data of a control device from the receiving unit to the transmitting unit.

BRIEF DESCRIPTION OF THE DRAWINGS

FIG. 10 is a flow chart of a control method of transmitting microprocessor unit and host device of a preferred embodiment of the invention.

DETAILED DESCRIPTION OF THE INVENTION

A preferred embodiment of the present invention will be described with reference to the drawings.

Figure 1:
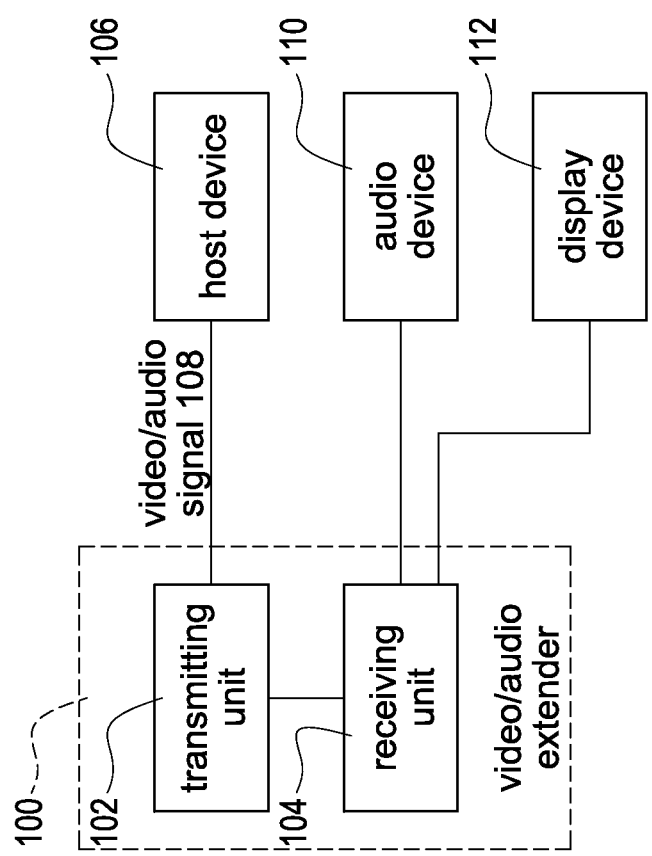
FIG. 1 is a block diagram of prior art of video/audio extender.
Figure 2:
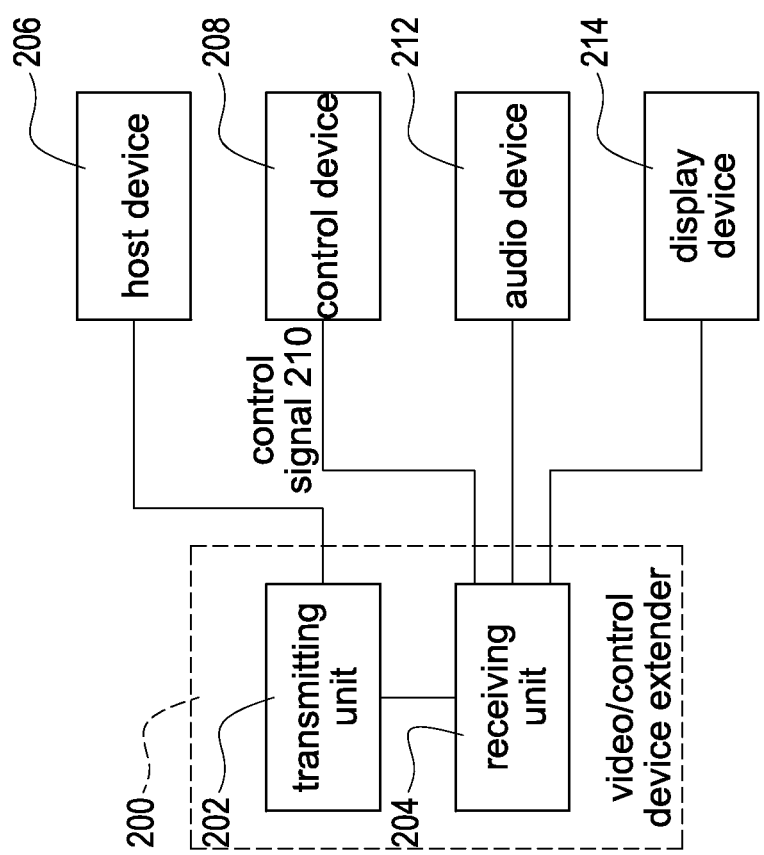
FIG. 2 is a block diagram of prior art of video/control device extender.
Figure 3:
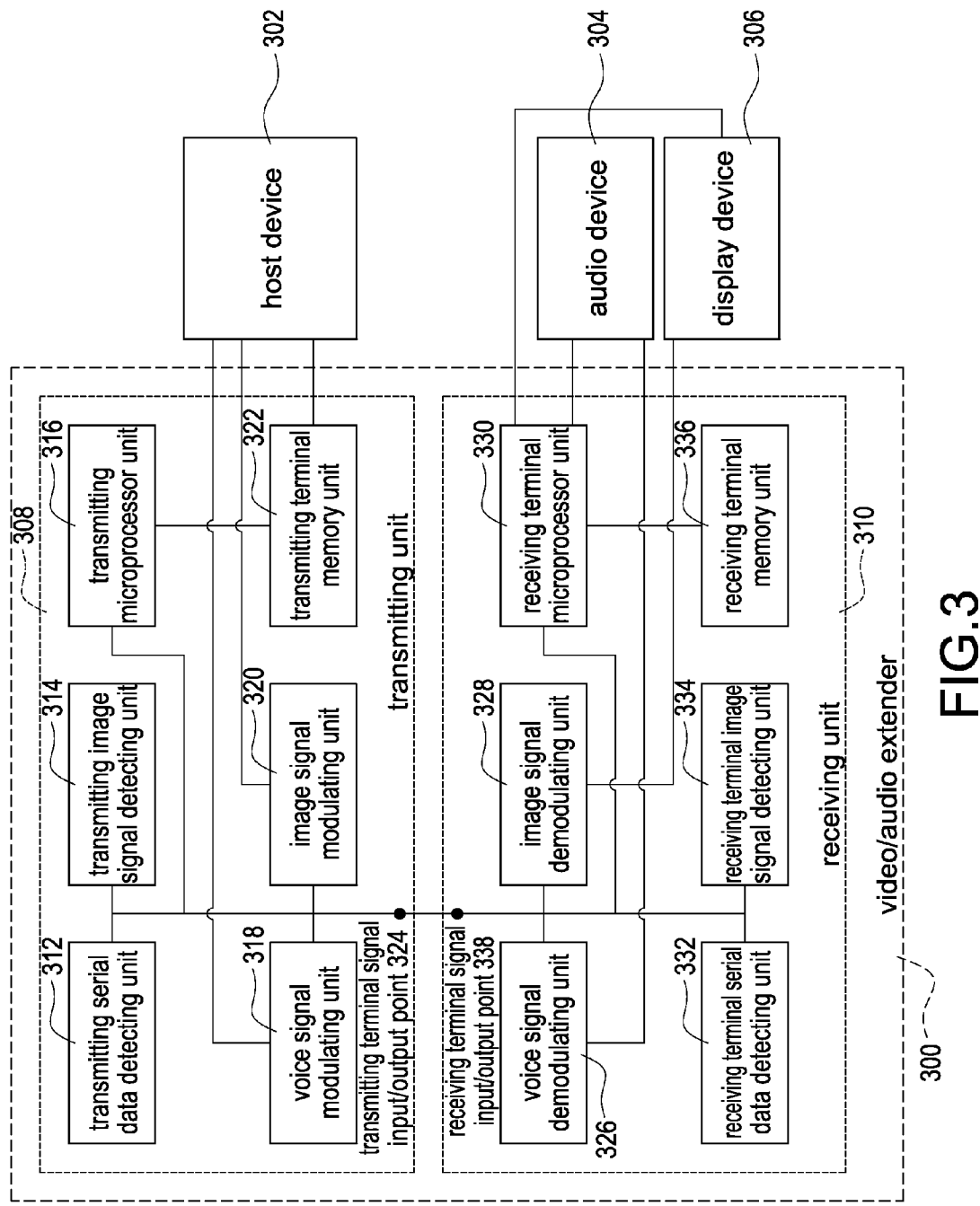
FIG. 3 is a block diagram of extender using a control method for extender of the invention.

Please refer to FIG. 3. FIG. 3 is a block diagram of extender using a control method for extender of the invention. A video/audio extender 300 is used in a host device 302, an audio device 304 and a display device 306. The video/audio extender 300 comprises a transmitting unit 308 and a receiving unit 310. The receiving unit 310 is provided relative to the transmitting unit 308 electrically connecting each other by a network cable or optical fiber.

The transmitting unit 308 comprises a transmitting terminal serial data detecting unit 312, a transmitting terminal image signal detecting unit 314, a transmitting terminal microprocessor unit 316, a voice signal modulating unit 318, an image signal modulating unit 320, a transmitting terminal memory unit 322 and a transmitting terminal signal input/output point 324.

The receiving unit 310 comprises a voice signal demodulating unit 326, an image signal demodulating unit 328, a receiving terminal microprocessor unit 330, a receiving terminal serial data detecting unit 332, a receiving terminal image signal detecting unit 334, a receiving terminal memory unit 336 and a receiving terminal signal input/output point 338.

The transmitting terminal signal input/output point 324 may electrically connect to the transmitting terminal serial data detecting unit 312, the transmitting terminal image signal detecting unit 314, the transmitting terminal microprocessor unit 316, the voice signal modulating unit 318 and the image signal modulating unit 320. The host device 302 may connect to the voice signal modulating unit 318, the image signal modulating unit 320 and the transmitting terminal memory unit 322.

The receiving terminal signal input/output point 338 may electrically connect to the voice signal demodulating unit 326, the image signal demodulating unit 328, the receiving terminal microprocessor unit 330, the receiving terminal serial data detecting unit 332 and the receiving terminal image signal detecting unit 334. The receiving terminal microprocessor unit 330 may electrically connect to the receiving terminal memory unit 336, the audio device 304 and the display device 306. The audio device 304 may electrically connect to the voice signal demodulating unit 326. The display device 306 may electrically connect to the image signal demodulating unit 328.

Figure 4:
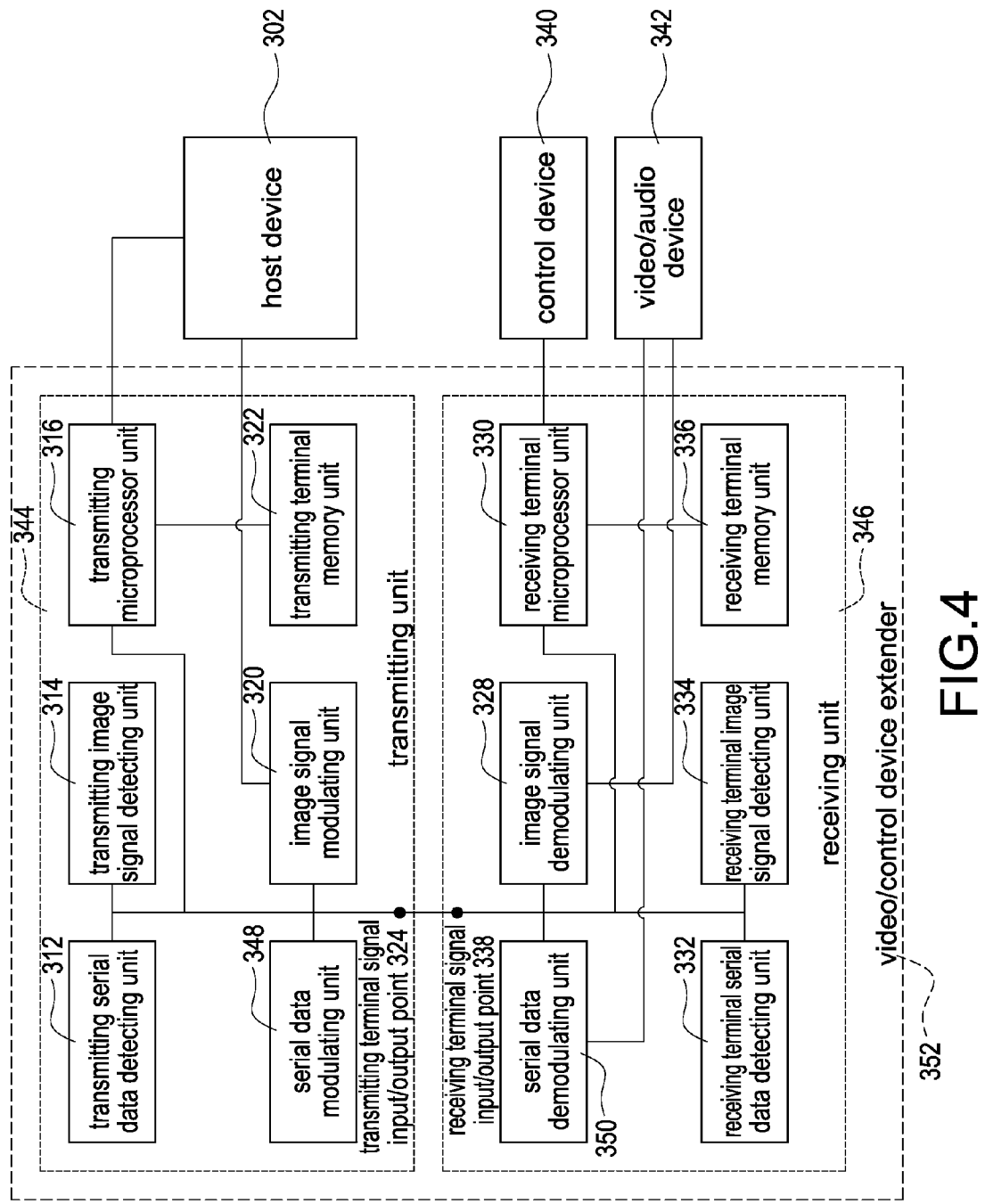
FIG. 4 is a block diagram of video/control device extender using a control method for extender of the invention

Please refer to FIG. 4. FIG. 4 is a block diagram of video/control device extender using a control method for extender of the invention. A video/control device extender 352 is used in a host device 302, a control device 340 and a video/audio device 342. The video/control device extender 352 comprises a transmitting unit 344 and a receiving unit 346. The receiving unit 346 is provided relative to the transmitting unit 344 electrically connecting each other by a network cable (not shown in FIG. 4) or optical fiber (not shown in FIG. 4).

The transmitting unit 344 comprises a transmitting terminal serial data detecting unit 312, a transmitting terminal image signal detecting unit 314, a transmitting terminal microprocessor unit 316, a serial data modulating unit 348, an image signal modulating unit 320, a transmitting terminal memory unit 322 and a transmitting terminal signal input/output point 324.

The receiving unit 346 comprises a serial data demodulating unit 350, the image signal demodulating unit 328, the receiving terminal microprocessor unit 330, the receiving terminal serial data detecting unit 332 and the receiving terminal image signal detecting unit 334, a receiving terminal memory unit 336 and a receiving terminal signal input/output point 338.

The transmitting terminal signal input/output point 324 may electrically connect to the transmitting terminal serial data detecting unit 312, the transmitting terminal image signal detecting unit 314, the transmitting terminal microprocessor unit 316, a serial data modulating unit 348 and the image signal modulating unit 320. The transmitting terminal microprocessor unit 316 may electrically connect to the transmitting terminal memory unit 322. The host device 302 may electrically connect to the image signal modulating unit 320 and the transmitting terminal microprocessor unit 316.

The receiving terminal signal input/output point 338 may electrically connect to the serial data demodulating unit 350, the image signal demodulating unit 328, the receiving terminal microprocessor unit 330, the receiving terminal serial data detecting unit 332 and the receiving terminal image signal detecting unit 334. The receiving terminal microprocessor unit 330 may electrically connect to the receiving terminal memory unit 336 and the control device 340. The video/audio device 342 may electrically connect to the serial data demodulating unit 350 and the image signal demodulating unit 328.

Figure 5:
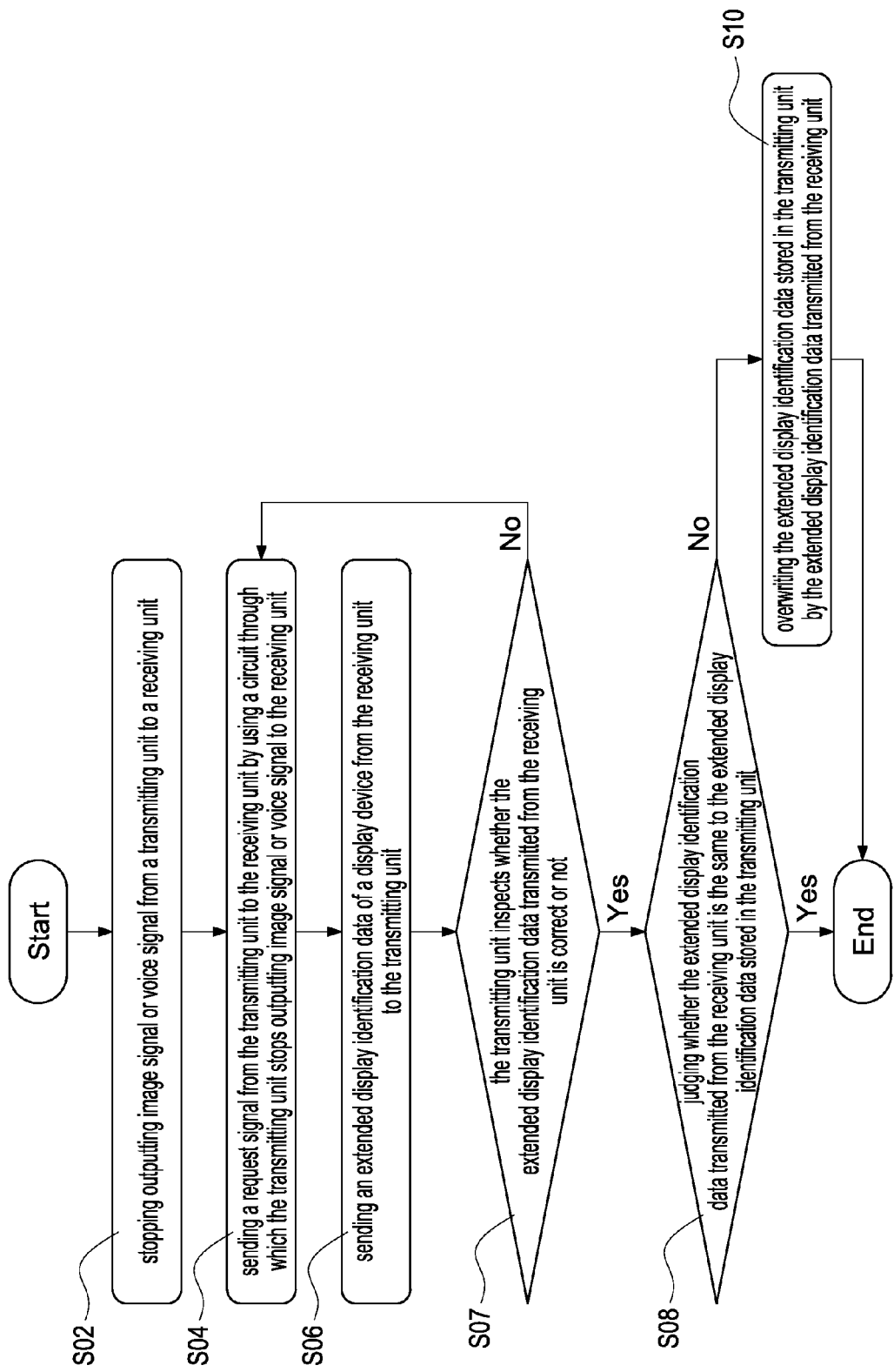
FIG. 5 is a flow chart of a control method for video/audio extender of a preferred embodiment of the invention.

Please refer to FIG. 5. FIG. 5 is a flow chart of a control method for video/audio extender of a preferred embodiment of the invention. Please also refer to FIG. 3. A control method for video/audio extender of the invention comprises the steps of:

S02: stopping outputting image signal or voice signal from a transmitting unit 308 to a receiving unit 310. For example, the transmitting terminal microprocessor unit 316 stops outputting image signal of the image signal modulating unit 320 to the image signal demodulating unit 328, or the transmitting terminal microprocessor unit 316 stops outputting voice signal of the voice signal modulating unit 318 to voice signal demodulating unit 326, that is it can only stop one of the above alternatives as depended on the design need.

S04: sending a request signal from the transmitting unit 308 to the receiving device unit by using a circuit through which the transmitting unit 308 stops outputting image signal or voice signal to the receiving unit 310. For example, the transmitting terminal microprocessor unit 316 sends the request signal to the receiving unit 310 by using the circuit through which the transmitting terminal microprocessor unit 316 stops outputting image signal of the image signal modulating unit 320 to the image signal demodulating unit 328, or the transmitting terminal microprocessor unit 316 stops outputting voice signal of the voice signal modulating unit 318 to voice signal demodulating unit 326.

S06: sending an extended display identification data of a display device 306 from the receiving unit 310 to the transmitting unit 308. For example, when the receiving terminal image signal detecting unit 334 detects the image signal modulation unit 320 stops outputting image signal or the receiving terminal serial data detecting unit 332 detects the voice signal modulating unit 318 stops outputting voice signal, the receiving terminal image signal detecting unit 334 sends a request signal to the receiving terminal microprocessor unit 330. When the receiving terminal microprocessor unit 330 receives the request signal, the receiving terminal microprocessor unit 330 reads the extended display identification data which is stored in the receiving terminal memory unit 336 and sends it to the transmitting unit 308.

S07: the transmitting unit 308 inspects whether the extended display identification data transmitted from the receiving unit 310 is correct or not. For example, the transmitting terminal microprocessor unit 316 may temporarily store the extended display identification data transmitted from the receiving unit 310 in the transmitting terminal memory unit 322. After the receiving unit 310 has finished the transmission, the transmitting terminal microprocessor unit 316 inspects if there has any error happened during the transmission. If there has error happened, return to step S04 and send the request signal to the receiving unit 310.

S08: judging whether the extended display identification data transmitted from the receiving unit 310 is the same to the extended display identification data stored in the transmitting unit 308. If both of the extended display identification data are the same, there is no action done or just send a simple same order code thereby the source of the transmitting terminal microprocessor unit 316 may be saved and the use life of the transmitting terminal memory unit 322 may be increased.

S10: if the extended display identification data transmitted from the receiving unit 310 is not the same to the extended display identification data stored in the transmitting unit 308, the extended display identification data transmitted from the receiving unit 310 may overwrite the extended display identification data stored in the transmitting unit 308.

Moreover, clock and data line of transmitting terminal memory unit 322 directly connects to display data channel (DDC) of the host device 302, so that the host device 302 may read data at any time. The users also may ask for repeating the above steps of S02~S10 at any time to obtain the latest extended display identification data.

Figure 6:
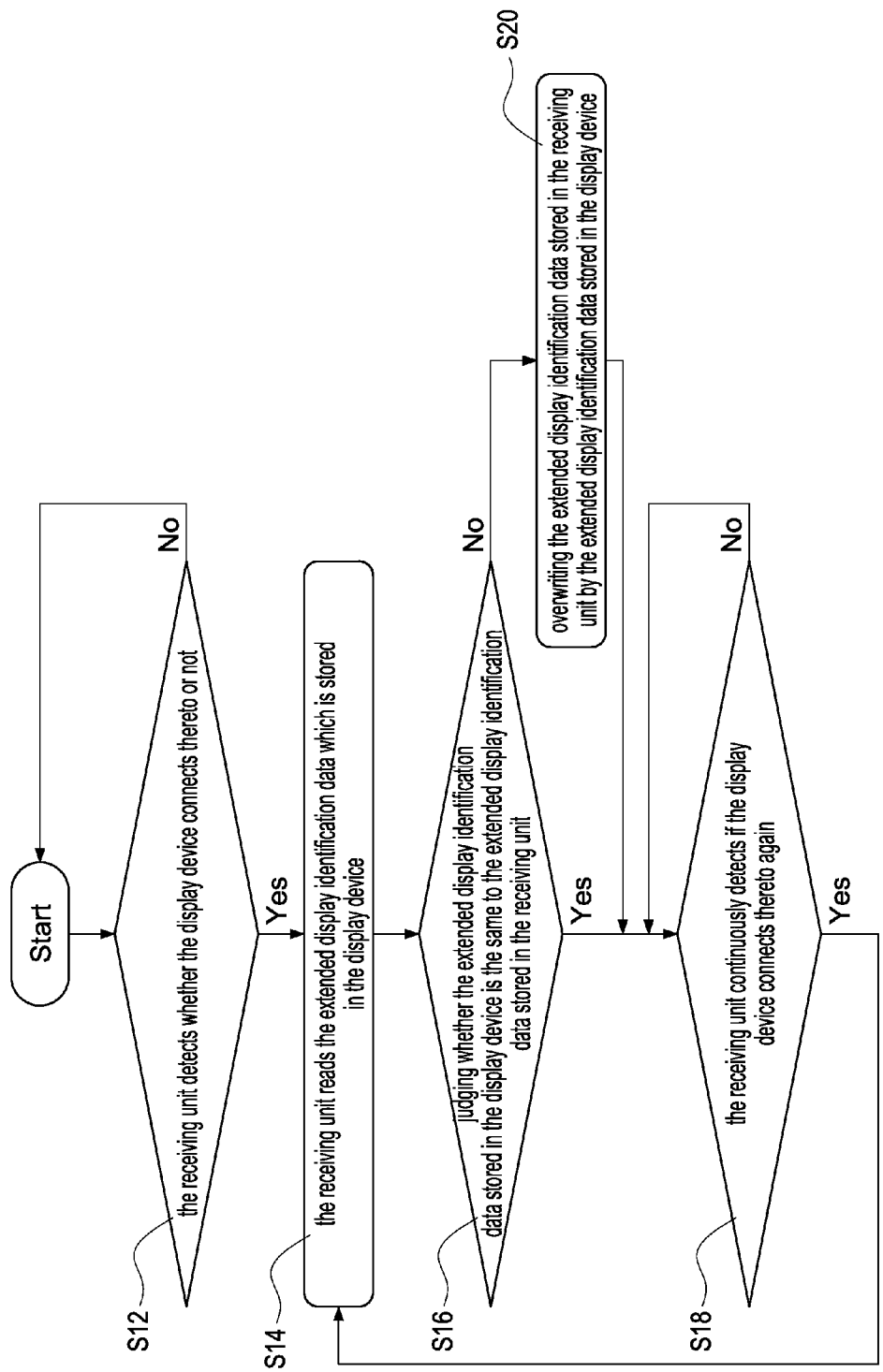
FIG. 6 is a flow chart of a control method for video/audio extender of another preferred embodiment of the invention.

Please refer to FIG. 6. FIG. 6 is a flow chart of a control method for video/audio extender of another preferred embodiment of the invention. Please also refer to FIG. 3. A control method for video/audio extender of the invention comprises the steps of:

S12: the receiving unit 310 detects whether the display device 306 connects thereto or not. If not connecting thereto, the receiving unit 310 detects continuously.

S14: if the receiving unit 310 detects the display device 306 connects thereto, the receiving unit 310 reads the extended display identification data which is stored in the display device 306.

S16: judging whether the extended display identification data stored in the display device 306 is the same to the extended display identification data stored in the receiving unit 310. If both of the extended display identification data are the same, there is no action done and enter to step of S18.

S18: the receiving unit 310 continuously detects if the display device 306 connects thereto again. If there is no connection again, the receiving unit 310 detects continuously. If there is connection again, return to step of S14.

S20: judging whether the extended display identification data stored in the display device 306 is the same to the extended display identification data stored in the receiving unit 310. If both of the extended display identification data are not the same, the extended display identification data stored in the display device 306 may overwrite the extended display identification data stored in the receiving unit 310 and enter step of S18.

Figure 7:
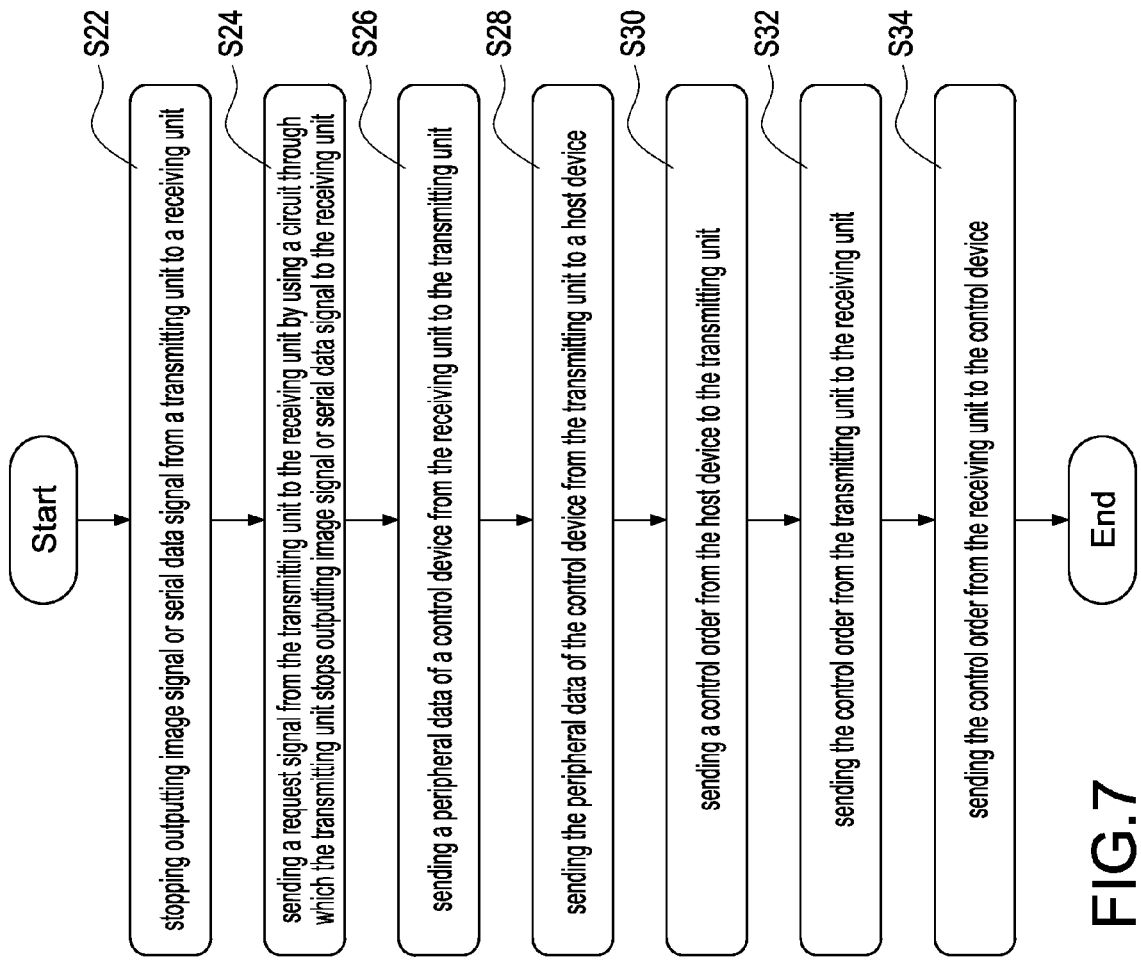
FIG. 7 is a flow chart of control method for video/control device extender of a preferred embodiment of the invention.

Please refer to FIG. 7. FIG. 7 is a flow chart of control method for video/control device extender of a preferred embodiment of the invention. Please also refer to FIG. 4. A control method for video/control device extender of the invention comprises the steps of:

S22: stopping outputting image signal or serial data signal from a transmitting unit 344 to a receiving unit 346. This step is similar to S02. The detail description is omitted.

S24: sending a request signal from the transmitting unit 344 to the receiving device 346 by using a circuit through which the transmitting unit 344 stops outputting image signal or serial data signal to the receiving unit 346. This step is similar to S04. The detail description is omitted.

S26: sending a peripheral data of a control device 340 from the receiving unit 346 to the transmitting unit 344. This step is similar to S06. The detail description is omitted.

S28: sending the peripheral data of a control device 340 from the transmitting unit 344 to host device 302. The users also may ask for repeating the above steps of S22~S28 at any time to obtain the latest the peripheral data.

S30: sending a control order from the host device 302 to the transmitting unit 344.

S32: sending the control order from the transmitting unit 344 to the receiving unit 346.

S34: sending the control order from the receiving unit 346 to the control device 340.

Figure 8:
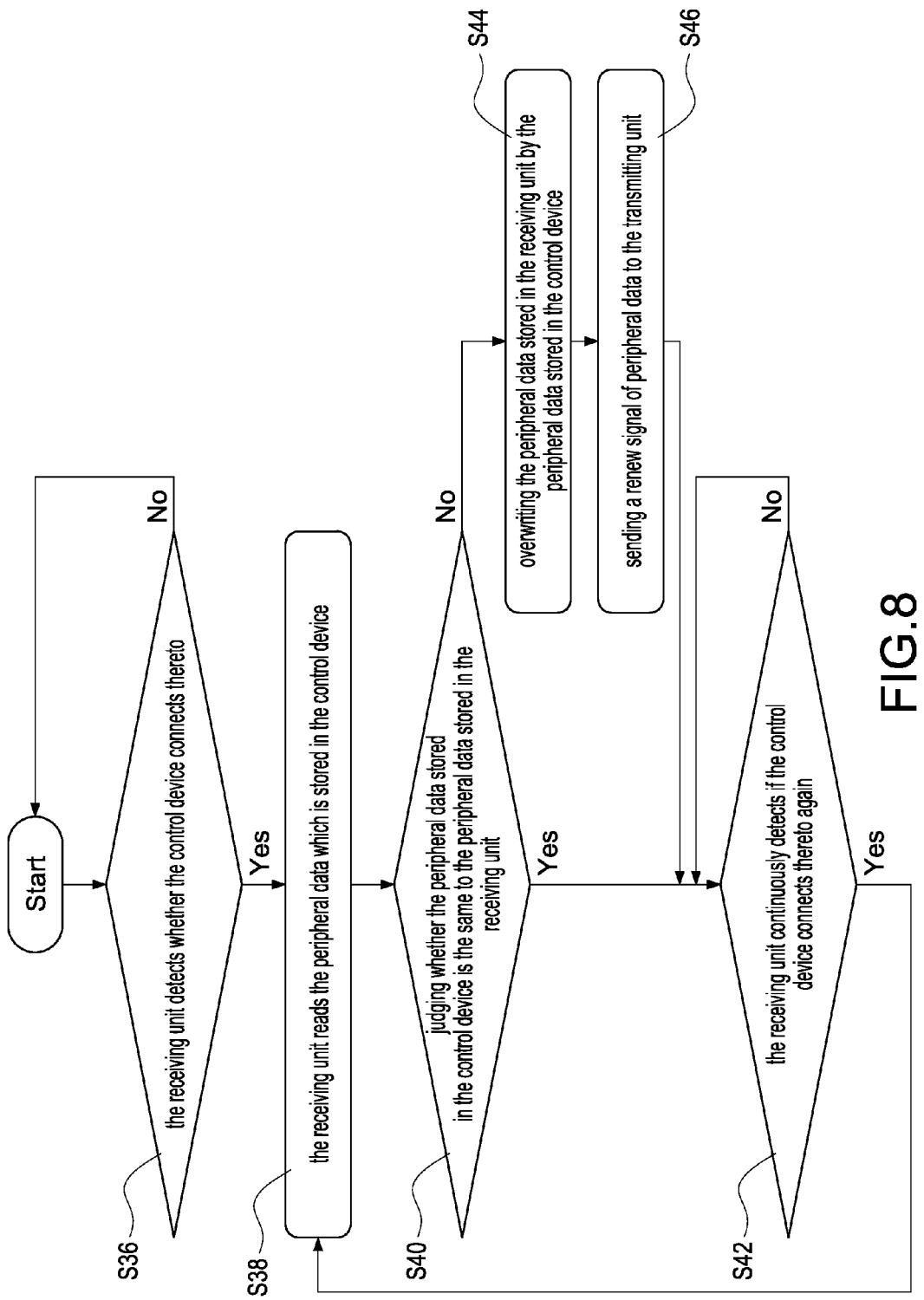
FIG. 8 is a flow chart of control method for video/control device extender of another preferred embodiment of the invention.

Please refer to FIG. 8. FIG. 8 is a flow chart of control method for video/control device extender of another preferred embodiment of the invention. Please also refer to FIG. 4. A control method for video/control device extender of the invention comprises the steps of:

S36: the receiving unit 346 detects whether the control device 340 connects thereto. If not connecting thereto, the receiving unit 346 detects continuously.

S38: if the receiving unit 346 detects the control device 340 connects thereto, the receiving unit 346 reads the peripheral data which is stored in the control device 340.

S40: judging whether the peripheral data stored in the control device 340 is the same to the peripheral data stored in the receiving unit 346. If both of the peripheral data are the same, there is no action done and enter to step of S42.

S42: the receiving unit 346 continuously detects if the control device 340 connects thereto again. If there is connection again, return to step of S38. If there is no connection again, the receiving unit 346 detects continuously.

S44: judging whether the peripheral data stored in the control device 340 is the same to the peripheral data stored in the receiving unit 346. If both of the peripheral data are not the same, the peripheral data stored in the control device 340 may overwrite the peripheral data stored in the receiving unit 346 and enter step of S46.

S46: sending a renew signal of peripheral data to the transmitting unit 344 thereby inform the host device 302 there are new control devices to be connected so that the connection need to be renewed, and enter step of S42.

Figure 9:
FIG. 9 is a flow chart of a control method of receiving terminal microprocessor unit and control device of a preferred embodiment of the invention.

Please refer to FIG. 9 and FIG. 10. FIG. 9 is a flow chart of a control method of receiving terminal microprocessor unit 330 and control device 340 of a preferred embodiment of the invention. FIG. 10 is a flow chart of a control method of transmitting microprocessor unit 316 and host device 302 of a preferred embodiment of the invention. As shown in the drawings, there is a special dynamic device mapping (DDM) method for connecting the extender to USB device or computer. The receiving terminal microprocessor unit 330 of receiving unit 346 may judge whether the enumeration procedure and data of new USB device connected thereto is the same to the last USB device data stored in the memory. If both of the USB devices data are the same, there is no action done and communicate and connect with new USB device and transmitting unit by the last USB device data stored in the memory without repeated enumeration procedure. If both of the USB devices data are not the same, the receiving terminal microprocessor unit 330 of receiving unit 346 may perform the complete enumeration procedure for the new USB device and store the enumeration procedure and data of new USB device in the memory.

However, if the new USB device, which is not a standard USB device, can not be processed by the receiving terminal microprocessor unit 330 of receiving unit 346, the receiving terminal microprocessor unit 330 of receiving unit 346 may transmit the command and data of non-standard USB device to the transmitting unit 344 to communicate with computer connected thereto directly by the above method. The transmitting unit 344 may also transmit the command and data asked or replied by the computer to the receiving unit 346 by the above method to complete communication and connection to the non-standard USB device by the receiving terminal microprocessor unit 330. The receiving terminal microprocessor unit 330 may store all of the enumeration procedure and data in the memory.

Likewise, the communication and connection of transmitting unit 344 and computer connected thereto is completed by the same above procedure. If there is non-standard command and data, it may be transmitted to the receiving unit 346 to communicate and transmit to the computer directly. The transmitting microprocessor unit 316 of transmitting unit 344 may store all of the enumeration procedure and data in the memory. Therefore, the transmitting unit 344 and the receiving unit 346 respectively complete the external connection and communication. When the USB device and computer connect and disconnect to the extender, the receiving terminal microprocessor unit 330 and the transmitting microprocessor unit 316 may perform dynamic device mapping and the complete enumeration procedure. It may not only reduce repeated transmission which is not necessary, but also prevent from problem of compatibility due to complete communication and enumeration of USB device and computer as a direct connection.

The control method for extender achieves a two-way transmission of information of the transmitting unit and the receiving unit each other by a circuit through which the transmitting unit stops outputting image signal, voice signal or serial data to the receiving unit for a extremely short outage (1~2 seconds). The users are not aware of the extremely short outage, if it is executed immediately after powering on. It can achieve the purpose of two-way transmission of information, good and stable image quality and smooth operation of control device without adding the number of cables, having complicate circuit layouts or decreasing some previous function. Further, the receiving unit may continuously detect whether the display device or control device connects thereto again.

In summary, the invention has industrial utilization, novelty and non-obviousness, and the structure of the invention has not seen in similar products and public use, in full compliance with the requirements of the application for a patent of invention, according to patent act.

What is claimed is:

1. A control method for an extender to achieve a two-way transmission of information, the extender having a transmitting unit and a receiving unit, the method comprising steps in sequence of:
   (a) a transmitting terminal microprocessor unit of the transmitting unit stopping outputting image signal of an image signal modulating unit of the transmitting unit to an image signal demodulating unit of the receiving unit, stopping outputting voice signal of a voice signal modulating unit of the transmitting unit to a voice signal demodulating unit of the receiving unit, or stopping outputting serial data of a serial data modulating unit of the transmitting unit to a serial data demodulating unit of the receiving unit;
   (b) the transmitting unit sending a request signal to a receiving terminal microprocessor unit of the receiving unit through a circuit that is for stopping outputting the image signal from the image signal modulating unit to the image signal demodulating unit, that is for stopping outputting the voice signal from the voice signal modulating unit to the image signal demodulating unit, or that is for stopping outputting the serial data from the serial data modulating unit to the serial data demodulating unit;
   (b1) when a receiving terminal image signal detecting unit of the receiving unit detects the image signal modulation unit stops outputting the image signal, a receiving terminal serial data detecting unit of the receiving unit detects the voice signal modulating unit stops outputting voice signal, the receiving terminal microprocessor unit is informed;
   (b2) the receiving terminal microprocessor unit reading extended display identification data of a display device or peripheral data of a control device which is stored in a receiving terminal memory unit of the receiving unit; and
   (c) sending the extended display identification data or the peripheral data from the receiving unit to the transmitting unit.

2. The control method for extender as claimed in claim 1, further comprising:
   (d) if the extended display identification data transmitted from the receiving unit is not the same to that of stored in the transmitting unit, the extended display identification data transmitted from the receiving unit overwrites the extended display identification data stored in the transmitting unit; and
   (e) if the extended display identification data transmitted from the receiving unit is the same to that of stored in the transmitting unit, there is no action done.

3. The control method for extender as claimed in claim 2, further comprising:
   (f) if the receiving unit detects that the display device fails to connect thereto, the receiving unit detects continuously; and
   (g) if the receiving unit detects that the display device connects thereto, the receiving unit reads the extended display identification data which is stored in the display device.

4. The control method for extender as claimed in claim 3, further comprising:
   (h) if the extended display identification data stored in the display device is not the same to the that of stored in the receiving unit, the extended display identification data stored in the display device overwrites the extended display identification data stored in the receiving unit; and
   (i) if the extended display identification data stored in the display device is the same to the that of stored in the receiving unit, there is no action done.

5. The control method for extender as claimed in claim 4, further comprising:
   (j) the receiving unit detects continuously whether the display device connects thereto again.

6. The control method for extender as claimed in claim 1, further comprising:
   (k) sending the peripheral data of the control device from the transmitting unit to a host device.

7. The control method for extender as claimed in claim 6, further comprising:
   (l) sending a control command from the host device to the transmitting unit.

8. The control method for extender as claimed in claim 7, further comprising:
   (m) sending the control command from the transmitting unit to the receiving unit.

9. The control method for extender as claimed in claim 8, further comprising:
   (n) sending the control command from the receiving unit to the control device.

10. The control method for extender as claimed in claim 9, further comprising:
    (o) if the receiving unit detects that the control device fails to connects thereto, the receiving unit detects continuously; and
    (p) if the receiving unit detects that the control device connects thereto, the receiving unit reads the peripheral data which is stored in the control device.

11. The control method for extender as claimed in claim 10, further comprising:
    (q) if the peripheral data stored in the control device is not the same to the peripheral data stored in the receiving unit, the peripheral data stored in the control device may overwrite the peripheral data stored in the receiving unit;
    (r) sending a renew signal of peripheral data to the transmitting unit; and
    (s) if the peripheral data stored in the control device is the same to the peripheral data stored in the receiving unit, there is no action done.

12. The control method for extender as claimed in claim 11, further comprising:

(t) the receiving unit continuously detects whether the control device connects thereto again.

\* \* \* \* \*